United States Patent [19]

Fullerton

[11] Patent Number: 5,580,200
[45] Date of Patent: *Dec. 3, 1996

[54] METHOD AND APPARATUS FOR RAPIDLY ENGAGING AND DISENGAGING THREADED COUPLING MEMBERS

[76] Inventor: Robert L. Fullerton, P.O. Box 4119, Incline Village, Nev. 89450

[*] Notice: The term of this patent shall not extend beyond the expiration date of Pat. No. 5,378,100.

[21] Appl. No.: 284,135

[22] Filed: Aug. 2, 1994

Related U.S. Application Data

[63] Continuation of Ser. No. 47,199, Apr. 16, 1993, Pat. No. 5,378,100.

[51] Int. Cl.⁶ .............................. F16B 37/08; F16B 39/36
[52] U.S. Cl. .......................... 411/267; 411/270; 411/433
[58] Field of Search .................................. 411/266, 267, 411/270, 433; 29/525.1

[56] References Cited

U.S. PATENT DOCUMENTS

| | | | |
|---|---|---|---|
| 2,021,051 | 11/1935 | Desbrueres . | |
| 2,896,496 | 7/1959 | Jansen . | |
| 3,157,215 | 11/1964 | Zahadiakin | 411/267 |
| 3,352,341 | 11/1967 | Schertz | 411/270 |
| 3,695,139 | 10/1972 | Howe . | |
| 3,870,332 | 3/1975 | Eaton | 285/35 |
| 4,172,606 | 10/1979 | Howe | 285/34 |
| 4,378,187 | 3/1983 | Fullerton | 411/267 |
| 4,974,888 | 12/1990 | Childers | 411/433 X |
| 5,081,811 | 1/1992 | Sasaki | 411/433 X |
| 5,118,237 | 6/1992 | Wright | 411/433 |
| 5,139,381 | 8/1992 | Lubreski et al. | 411/433 |

*Primary Examiner*—Neill R. Wilson
*Attorney, Agent, or Firm*—Staas & Halsey

[57] ABSTRACT

A coupling device including a first member provided with external threads and a second member having an opening therein into which the first member is inserted. The second member is provided with a plurality of movably mounted internally threaded elements for receiving the external threads of the first member. A structure is provided whereby the first member may be inserted within the second member by rectilinear sliding movement, afterwhich the first member is rotated into tight engagement with the second member. Release of the first member is accomplished by rotating the first member very slightly in the opposite direction, afterwhich simple manual manipulation of the second member withdraws the threaded elements from engagement permitting the first member to be slidably removed from the second member.

9 Claims, 5 Drawing Sheets

METHOD AND APPARATUS FOR RAPIDLY ENGAGING AND DISENGAGING THREADED COUPLING MEMBERS

BACKGROUND AND SUMMARY OF INVENTION

This application is a continuation of Ser. No. 08/047,199 filed Apr. 16, 1993, now Pat. No. 5,378,100.

The present invention relates to a coupling device featuring threaded members capable of rapid engagement and disengagement. Threaded coupling devices, such as conventional nuts and bolts, have often proven ineffective in highly specialized applications, for example, where speed is required, or where extended rotating movement is undesirable. Efforts have been made to design threaded coupling devices which may be assembled by rapid rectilinear movement followed by final tightening by rotating one member relative to the other. Just as there is a need to reduce the time and effort required to assemble threaded coupling members, there also exists a need to simplify and speed up the process of disengaging threaded coupling devices.

The coupling device of the present invention includes a first member provided with external threads and a second member having an opening therein into which the first member is inserted. The second member is provided with pluralities of movably mounted internally threaded elements for receiving the external threads of the first member. Structure is provided whereby the first member may be inserted within the second member by rectilinear sliding movement for a predetermined distance afterwhich the first member may be rotated into tight engagement with the second member. Release of the first member may be accomplished simply by rotating the first member very slightly in the opposite direction, afterwhich simple manual manipulation of the second member withdraws the threaded elements from engagement permitting the first member to be slidably removed axially from the second member. With the present invention it is therefore possible to attach and detach threaded couplings quickly with only minimal rotating action.

DESCRIPTION OF THE PREFERRED EMBODIMENT

Figure 1:
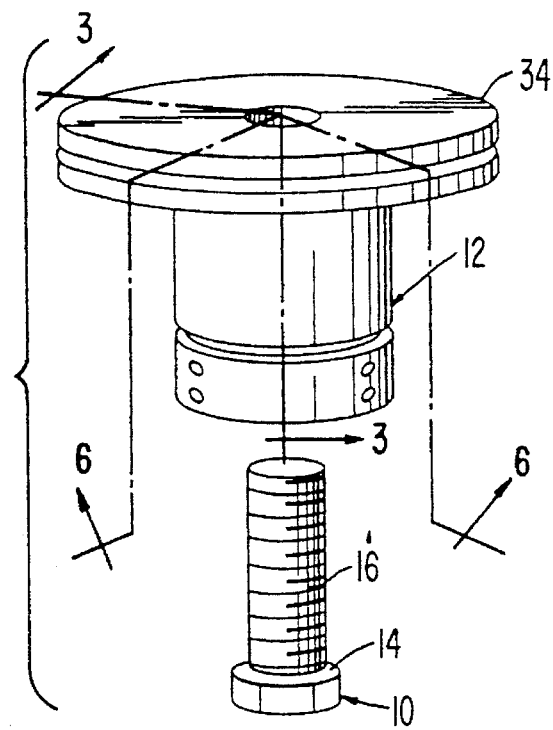
FIG. 1 is a perspective view illustrating generally the components of the coupling device, including the first externally threaded member and the second internally threaded member which receives the first member.

As seen in FIG. 1, the coupling device of the present invention includes a first member 10 provided with threads and a second member 12 having a threaded opening therein into which the first member 10 may be inserted in locking relationship. More specifically, the first member 10 in the preferred embodiment is a bolt provided with a head 14 and helical threads 16 on the shaft thereof. The second member 12 will now be described with reference to FIGS. 2, 3 and 6.

The second member 12 includes a sleeve 18 into which is slidably mounted a cylinder 20. The cylinder 20 is provided with a series of slots 22 through which corresponding keys 24 pass. The keys 24 are attached to the sleeve 18 with fasteners 26.

Figure 3:
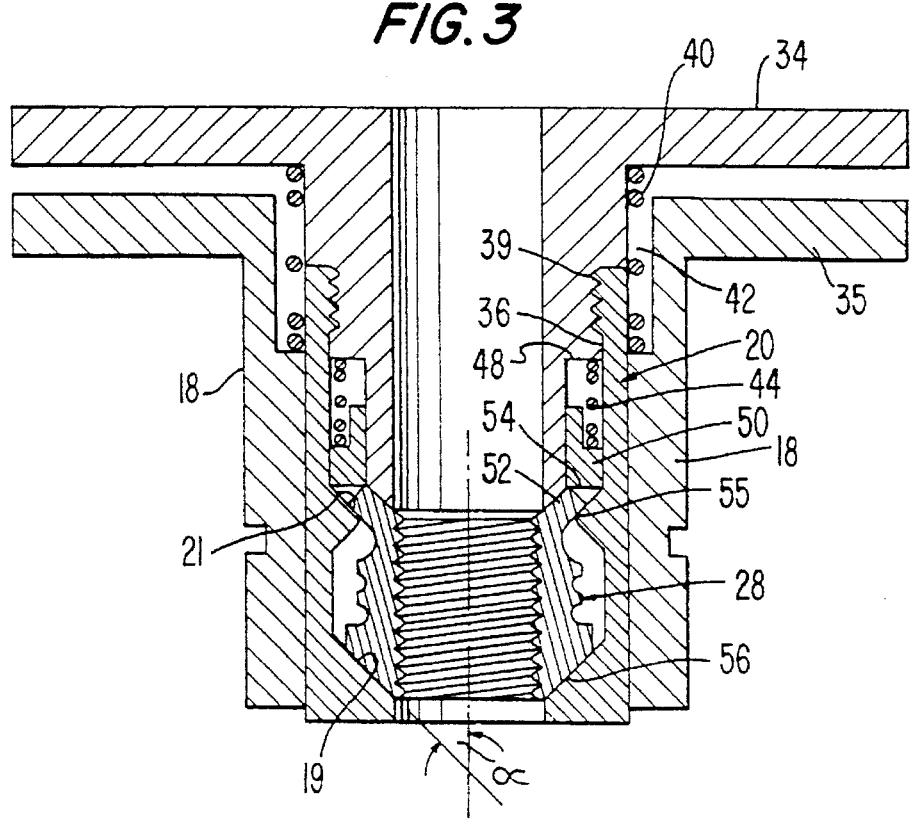
FIG. 3 is a sectional view taken along line 3—3 of FIG. 1 illustrating in particular the various frustoconical surfaces within the second coupling member.

The cylinder 20 is provided with a frustoconical surface 19, as best seen in FIG. 3. More particularly, the frustoconical surface 19 is a surface of revolution extending at an acute angle $\alpha$ to the longitudinal axis of the sleeve 18 and cylinder 20 along which the first member 10 moves. A second frustoconical surface 21 is provided within the cylinder 20 extending at an acute angle $\alpha$ to the longitudinal axis of the sleeve 18 and the cylinder 20.

Figure 4:
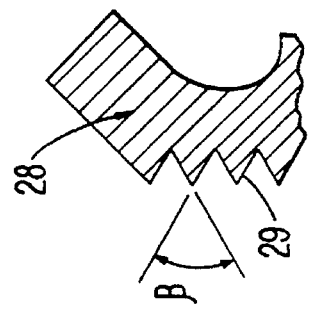
FIG. 4 is an enlarged cross-sectional view of the threads of the movably mounted threaded elements.

A plurality of movably mounted, externally threaded elements generally designated by the reference numeral 28 are positioned within the lower cavity of the cylinder 20. The movably mounted threaded elements 28, which in the preferred embodiment are three in number, are held in place and urged downwardly within the cavity 30 by the washer 32, as explained hereinafter. As illustrated in FIG. 4, the movably mounted threaded elements 28 are provided with internal threads 29 coaxial with the cylinder 20. The internal threads 29 have an apex angle $\beta$.

Figure 2:
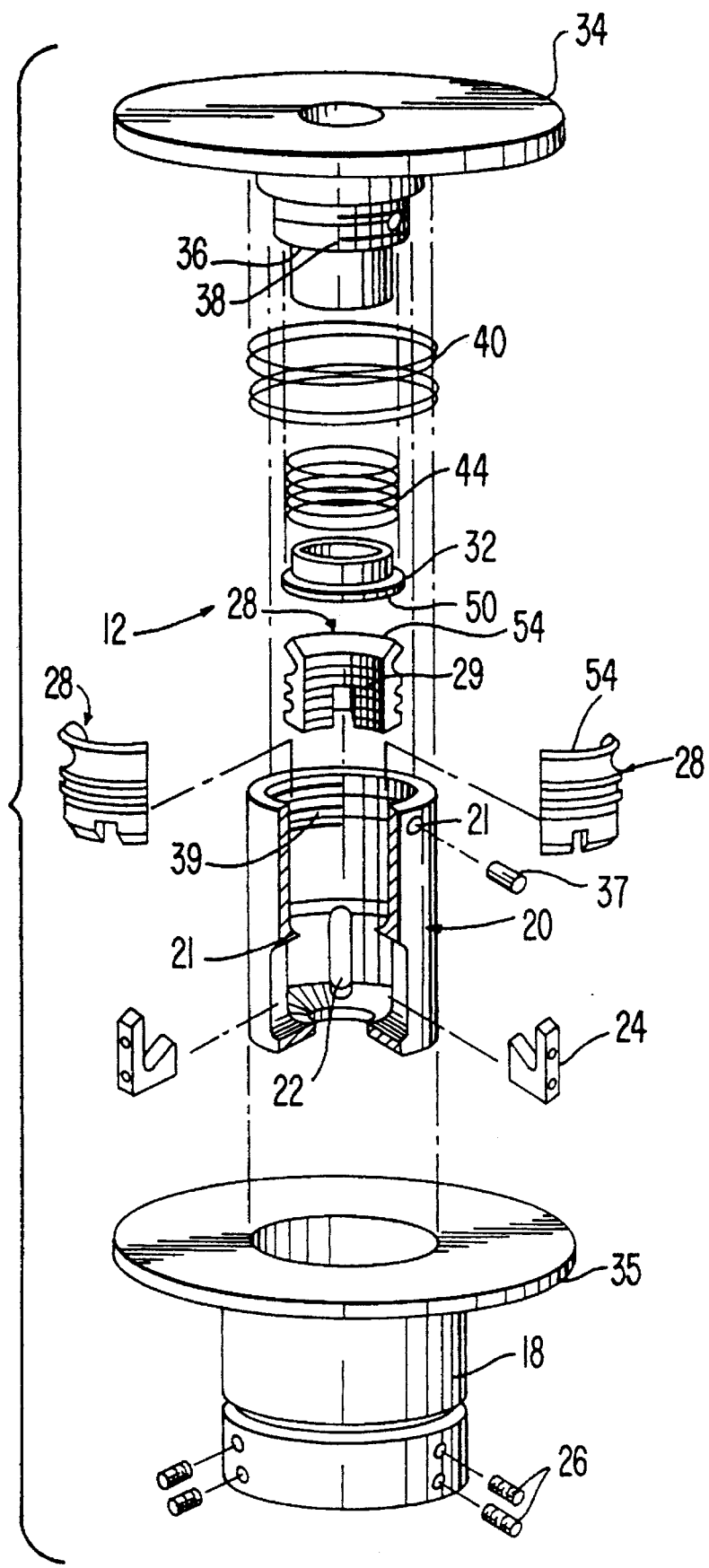
FIG. 2 is an exploded perspective view illustrating the parts of the second coupling member, particularly the structure for movably mounting the internally threaded elements and the key elements for causing the internally threaded elements to withdraw facilitating easy sliding removal of the first member in an axial direction along a rectilinear path.

The second member 12 includes a cap 34 which is mounted for movement relative to the sleeve 18. The cap 34 includes a shoulder 36 provided with threads 38 which engage the threads 39 of the cylinder 20 permitting the cap 34 to be screwed in place within the cylinder 20. A hole 35 is provided in the shoulder 36 for receiving a locking pin 37 which passes through the hole 21 in the cylinder 20. In this manner, proper alignment of the cap 34 and the cylinder 20 with the slots 22 and key elements 24, sleeve 18 and the threaded elements 28 is insured. As seen in FIGS. 2–3, a coil spring 40 is positioned within the gap 42 between the outer wall of the cap 34 and the inner wall of the sleeve 18. The coil spring 40 normally urges the cap 34 and the sleeve 18 in opposite directions.

A second coil spring 44 is positioned within the cavity 46 between the shoulder 48 of the cap 34 and the lip 50 of the washer 32. The second coil spring 44 normally urges the washer 32 downwardly such that the lip 50 thereof engages the upper edges 54 of the movably mounted threaded elements 28, as seen in FIG. 5.

Figure 6:
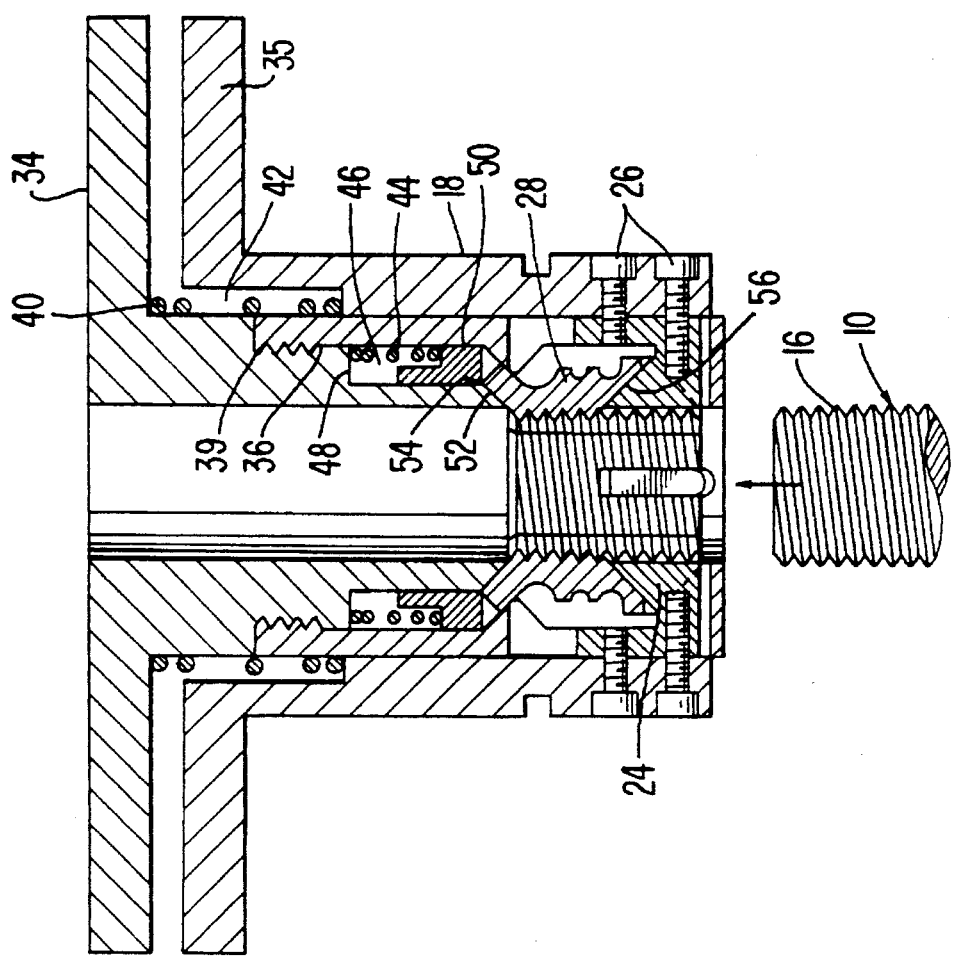
FIG. 6 is a sectional view of the coupling device illustrating the position of the various parts of the second coupling member prior to introducing the first member therein.
Figure 5:
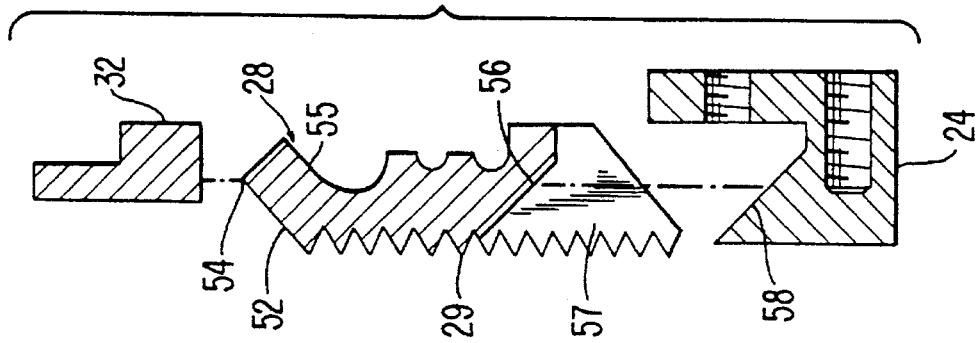
FIG. 5 is an enlarged cross-sectional view of one of the movably mounted threaded elements, illustrating in particular the spring-biased washer for exerting downward pressure thereon to normally urge the threaded element inwardly in a radial direction, and the associated key element manually operated by the user to urge the threaded element outwardly in a radial direction to release the first coupling member.

The cross section of each of the movably mounted internally threaded elements 28 is depicted in FIGS. 3, 5 and 6. Each threaded element 28 includes at the top on the inner surface thereof a frustoconical surface 52 terminating at the upper portion thereof in the edge 54 against which the bottom of the lip 50 of the washer 32 abuts. Each of the elements 28 is also provided with a frustoconical surface 55 extending at an acute angle α to the axis of the sleeve 18, thus permitting easy sliding movement between the frustoconical surfaces 21 and 55.

Still further, each of the movably mounted internally threaded elements 28 is provided near the bottom thereof with a frustoconical surface 56 which extends at an acute angle α to the axis of the cylinder 20. The frustoconical surfaces 56 of the movably mounted threaded elements 28 are thereby adapted to axially abut and slide on the frustoconical surface 19 of the cylinder 20. Moreover, the frustoconical surface 56 of each of the elements 28 abuts the sloping surface 58 of each of the keys 24.

In the preferred embodiment of the present invention, the acute angle α(FIG. 3) of the aforementioned frustoconical surfaces is less than the apex angle β of the threads 29 of the elements 28. Thus, the inclined surfaces of the threads 29 extend at greater acute angles to the axis of the cylinder 20, then the frustoconical surfaces of the cylinder 20. By way of example only, with a bolt having threads 16 and elements 28 having threads 29 of apex angles of 60°, it is advantageous to form the aforementioned frustoconical surfaces of angles α of approximately 45°.

The structural relationship between the keys 24 and the movably mounted internally threaded elements 28 and the operation thereof will now be described. Each of the keys 24 protrudes through a slot 22 formed in the cylinder 20 and engages the sloping surface 56 of the movably mounted threaded element 28. As seen in FIG. 5, each of the threaded elements 28 is provided with a notch 57 defining the downwardly sloping contact surface area 56 which is complementary in configuration with respect to the downwardly sloping contact surface 58 of the key 24. Thus, as the cap 34 is manually moved closer to the sleeve 18, the keys 24 move upwardly causing the threaded elements 28 to move outwardly disengaging the threads 29 thereof from the threads 16 of the first member 10.

FIG. 6 illustrates the position of the movably mounted, internally threaded elements 28 before the first member or bolt 10 is inserted within the second member 12. It will be apparent that the groups of threaded elements 28 are urged inwardly towards each other in an axial direction by the force of the second spring 44.

Figure 7:
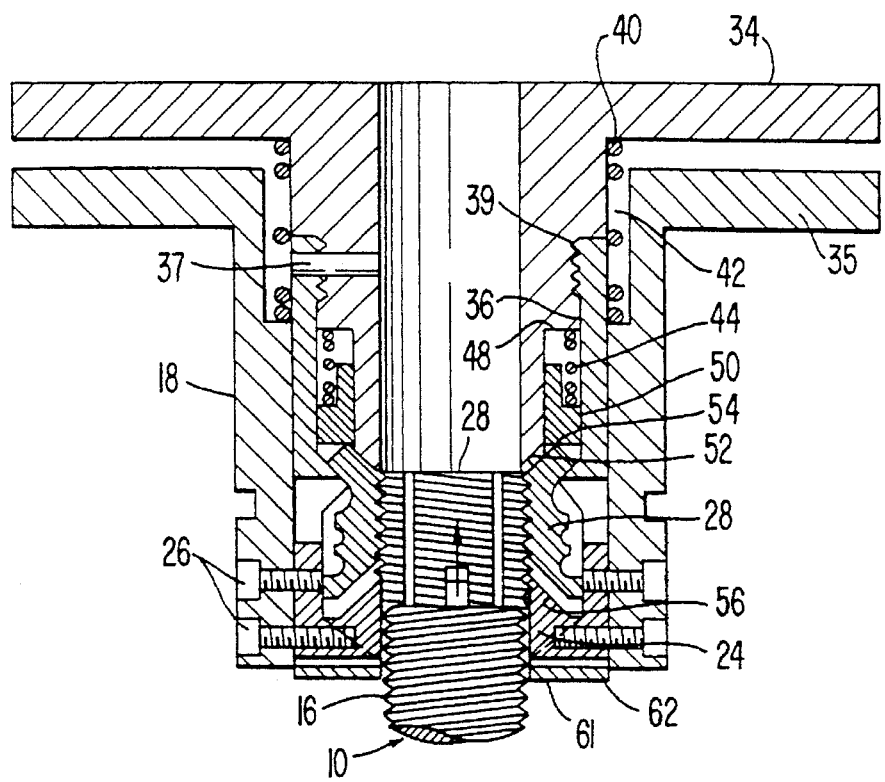
FIG. 7 is a sectional view of the coupling device illustrating the position of the parts of the second coupling member during movement of the externally threaded first member into the internally threaded second member.
Figure 10:
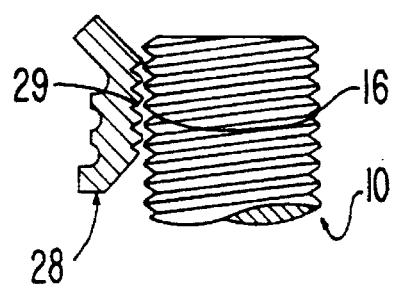
FIG. 10 is a schematic diagram illustrating the crest-to-crest relationship of the threads 16 of the first member or bolt 10 and the threads 29 of the threaded sections 28 during sliding movement of the first member into the second coupling member.

FIG. 7 illustrates the position of the parts when the first member or bolt 10 is moved into the second member 12 by sliding movement, i.e., the bolt 10 is moved inwardly merely by pushing it without rotation. It will be apparent that as the threads 16 of the first member 10 engage the threads 29 of each of the threaded elements 28, the elements 28 are moved radially outward. With reference to the schematic of FIG. 10, it can be seen that during sliding movement of the bolt 10, the threads 16 and 29 are in crest-to-crest relationship. With the threads 16 and 29 in this position, the bolt 10 could be advanced by rotation, if desired, but in accordance with the objectives of the present invention only sliding movement is used.

Figure 8:
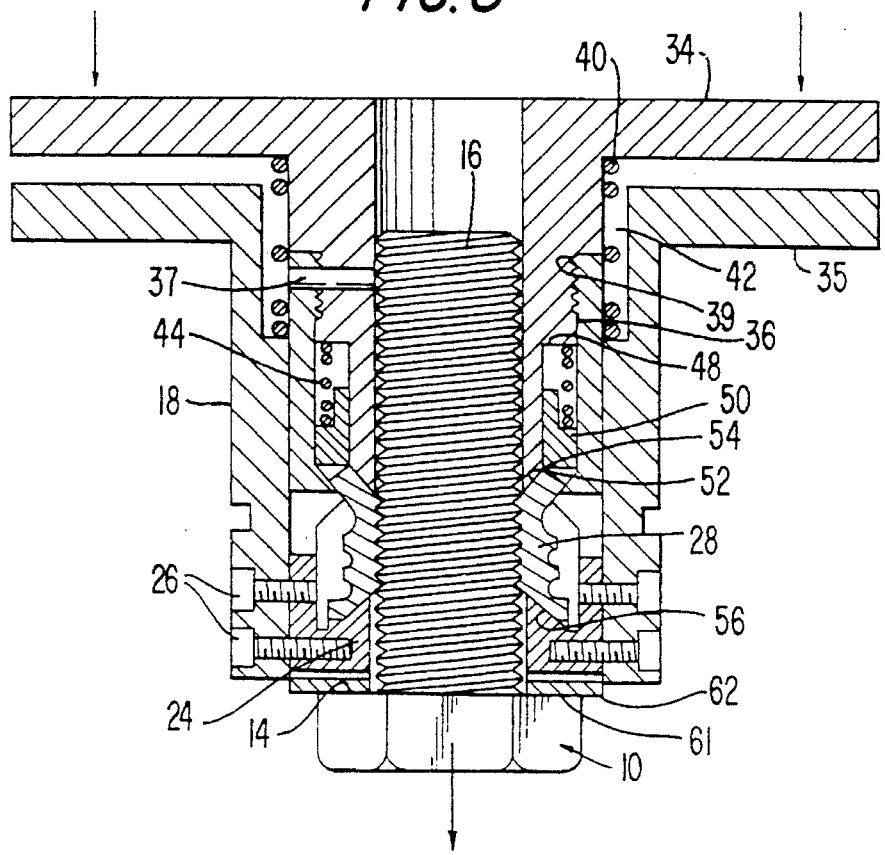
FIG. 8 is a sectional view of the coupling device illustrating the position of the parts of the second coupling member when the first coupling member is fully threaded therein.

FIG. 8 illustrates the first member or bolt 10 fully inserted within the second member 12. After the first member or bolt 10 is pushed all the way into the second member 12, or as close thereto as may be desired or practical, the head 14 is manually rotated until the inside surface 61 of the head 14 abuts the lower surface 62 of the sleeve 18, thus locking the first member 10 within the second member 12. It is understood that since the threaded elements 28 are movably mounted within the cylinder 20, there is some capability of movement even when the bolt 10 is being inserted within the elements 28. Thus, when the head 14 of the bolt 10 is rotated the frictional force between the threads 16 and 29 is enhanced by the resiliency of the engagement between the threaded elements 28 and the threaded bolt 10. That is, because the threaded elements 28 are not rigidly positioned within the cylinder 20—as in the case of most fastening nuts—the tightening of the bolt 10 by rotation tends to resiliently urge the threaded elements 28 downwardly providing an unusually tight locking action. Safety features are provided to guard against accidental unlocking. The cap 34 is continuous metal to base to guard against "bump release;"the shoulder 35 of the sleeve 18 must be pulled toward the cap 34 to effect release. Also, the shoulder 35 of the sleeve can not be moved toward the cap 34 until the tension between the threads is released.

Figure 9:
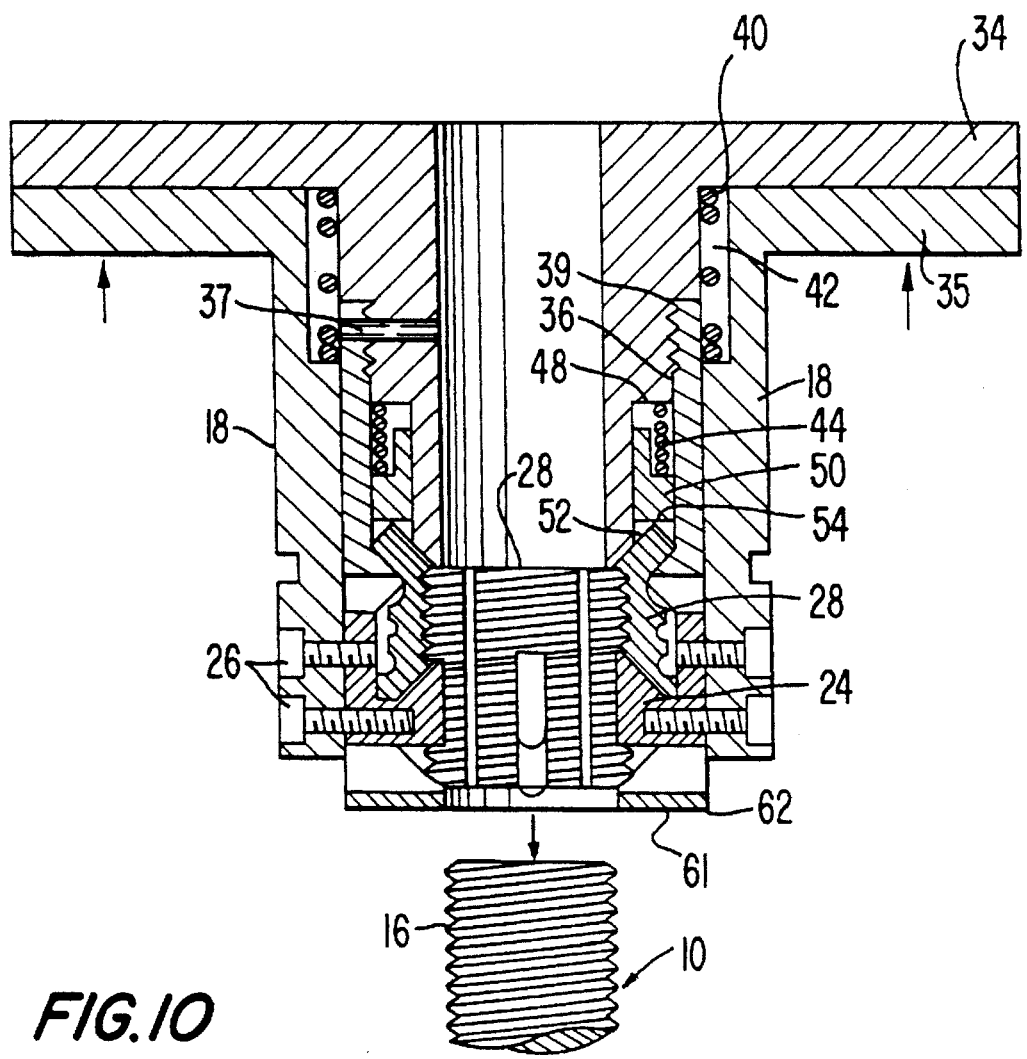
FIG. 9 is a sectional view of the coupling device illustrating the position of the parts of the second coupling member when manual force is applied thereto withdrawing the threaded elements of the second coupling member thereby releasing the first coupling member for sliding, outward movement along a rectilinear path.

FIG. 9 illustrates releasing of the first member 10. More particularly, as the top 34 and the shoulder 35 of the sleeve 18 are moved in close proximity to one another against the force of the first coil spring 40, the upward movement of the keys 24, and the sliding movement of the supporting surfaces 58 of the keys 24 and the supporting surfaces 56 of the threaded elements 28 promoted thereby, move the threaded elements 28 outwardly away from each other in a radial direction, thus releasing the engagement between the threads 16 of the first member 10 and the threads 29 of the threaded elements 28, thus permitting the first member 10 to be removed by rectilinear, sliding movement. It is to be noted, returning to FIG. 8, that the first member or bolt 10 is locked securely in place by rotation, as previously described. It is therefore necessary, before the first member 10 can be released, to rotate same briefly in a counterclockwise direction to release the locking action between the threads 16 and 29. With the foregoing in mind, after the first member 10 is briefly rotated counterclockwise, the shoulder 35 of the sleeve 18 is moved towards the cap 34, thus withdrawing the threaded elements 28 releasing the first member 10. If, for example, the coupling device of the present invention is oriented vertically such as seen in FIG. 9, after unlocking the bolt 10 and moving the shoulder 35 of the sleeve 18 upwardly towards the cap 34, the bolt 10 will actually drop freely from the assembly under the influence of gravity.

Although a preferred embodiment of the present invention has been described, it is to be understood that other embodiments may exist and changes made without departing from the spirit and scope of the invention.

What is claimed is:

1. A coupling device comprising:

a first member provided with threads;

a second member having an opening therein lying along a longitudinal axis into which said first member may be inserted;

threaded elements movably mounted with respect to said second member;

means permitting said first member, as it is inserted within said opening and moved along said axis by sliding movement, to cause said threaded elements to move radially outward, afterwhich brief rotating movement of said first member tightly moves said first member into engagement with said second member; and means moving said threaded elements radially outward, permitting said first member to be moved outwardly along said axis by sliding movement.

2. A coupling device as in claim 1, wherein said threaded elements comprise a plurality of internally threaded elements having frustoconical surfaces mating with corresponding frustoconical surfaces within the second member thus permitting said threaded elements to move inwardly and outwardly in a radial direction relative to the second member and means biasing said threaded elements inwardly within said second member.

3. A coupling device as in claim 2, wherein said means moving said threaded elements radially outward comprises a movably mounted key element associated with each of said internally threaded elements and provided with a sloping supporting surface, each of said threaded elements having a corresponding sloping supporting surface, such that movement of said key elements causes sliding movement of said threaded elements along the juncture of said sloping supporting surfaces moving said internally threaded elements outwardly.

4. A coupling device as in claim 3, wherein said means moving said threaded elements outwardly further comprises a cap associated with said second member, means biasing said cap away from said second member, said threaded elements being movable with said cap whereas said key elements move with said second member, such that movement of said cap and said second member towards each other against the force of said biasing means causes the aforementioned movement of said key elements.

5. A coupling device as in claim 1, wherein said second member comprises a cylinder provided with a plurality of slots therein, a plurality of threaded elements, means mounting said elements to move between a first inner position wherein the threads are positioned to mate with the threads of said first member and a second, outer position wherein the threads are out of engagement with the threads of said first member, means urging said threaded elements to said first, inner position, slotted portions within said threaded elements including inclined supporting surfaces, and wherein said means moving said threaded elements outwardly permitting said first member to move outwardly along said axis by sliding movement comprises key elements extending through said slots of said cylinder including sloping supporting surfaces engaging the supporting surfaces of said threaded elements and means moving said keys upwardly causing said threaded elements to move outwardly towards said second position as there is sliding movement between the supporting surfaces of the keys and the threaded elements.

6. A coupling device as in claim 5, wherein said means moving said key elements comprises a sleeve, said key elements secured to said sleeve, a cap connected to said cylinder, spring means urging said cap and sleeve away from each other, such that manual movement of said cap and sleeve towards each other moves said key elements, the sliding action between said supporting surfaces of said key elements and the threaded elements moving said threaded elements to their second outer position.

7. A coupling device comprising:

a first member provided with threads;

a second member having an opening therein lying along a longitudinal axis into and out of which said first member may be inserted and removed;

threaded elements associated with said second member, means mounting said threaded elements to move relative to said second member;

means moving said threaded elements radially outward permitting said first member to be moved inwardly along said axis by axial sliding movement; and means moving said threaded elements radially outward permitting aid first member to be moved outwardly along said axis by axial sliding movement.

8. A coupling device as in claim 7, including means permitting brief rotation of said first member in a first direction to move same tightly into engagement with said second member after said axial sliding movement of said first member; and means permitting brief rotation of said first member in a direction opposite to said first direction to release the tight engagement of said first member with said second member, after which said first member may be moved outwardly by axial sliding movement.

9. A method of rapidly engaging and disengaging first and second coupling members provided with external and internal threads, respectively, comprising the steps of:

inserting the first coupling member within the second coupling member;

moving the internal threads of the second coupling member apart from each other;

continuing to move the first coupling member within the second coupling member by sliding movement;

briefly rotating the first coupling member such that the external threads thereof tightly engage the internal threads of the second coupling member locking the coupling members together;

rotating the first coupling member in the opposite direction to release the tight engagement between the external threads of the first coupling member and the internal threads of the second coupling member;

moving the internal threads of the second coupling member apart from each other; and removing the first coupling member from the second coupling member by sliding movement.

* * * * *